Figure 1:
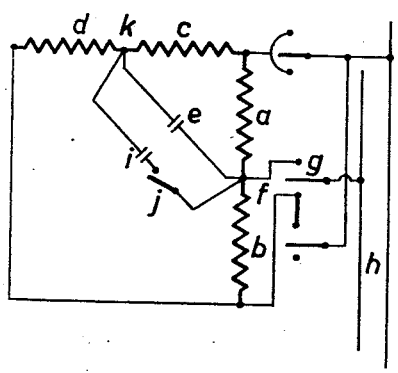

Dec. 17, 1957   I. L. LA COUR   2,817,050
SINGLE PHASE ELECTRIC MOTORS
Filed Oct. 15, 1956   2 Sheets-Sheet 1

Inventor
Jens Lassen la Cour
by Sommers & Young
Attorneys

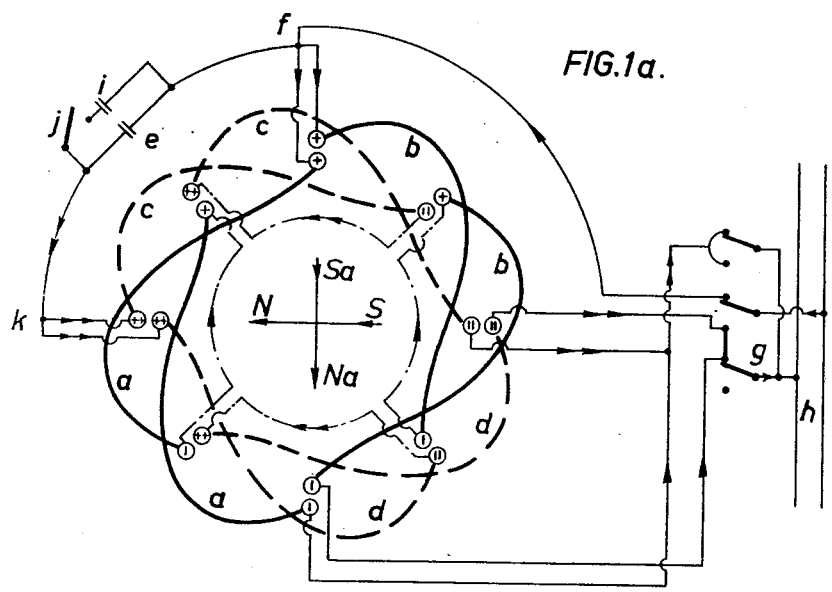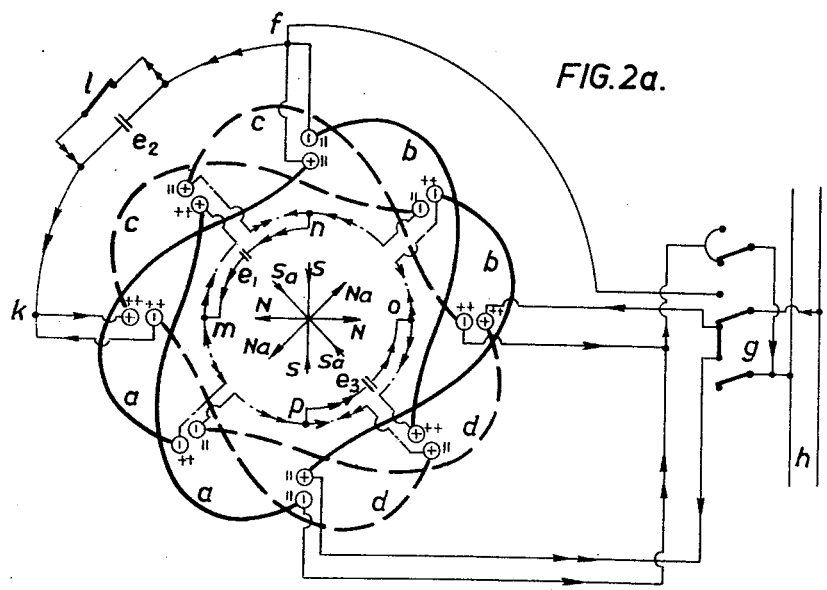

United States Patent Office 2,817,050
Patented Dec. 17, 1957

2,817,050
SINGLE PHASE ELECTRIC MOTORS
Iens Lassen la Cour, Halsingborg, Sweden
Application October 15, 1956, Serial No. 615,954
Claims priority, application Sweden August 23, 1956
3 Claims. (Cl. 318—221)

The present invention relates to single phase electric motors, and more particularly to two-speed single phase motors. Hitherto, the stator windings used in connection with motors of this kind, which by regrouping may change the number of poles in the relation of 1 to 2, suffer from the drawback, that they give the motor essentially better qualities only either at the higher or at the lower number of poles.

An object of the invention is to provide a two-speed single phase motor which works fairly well at both numbers of poles.

This object may be best obtained if the magnetic fluxes at the two numbers of poles stand approximately in the relation of 1 to $\sqrt{2}$ to each other.

A motor realizing this condition is described in the U. S. application Serial No. 429,089. Said motor, however, is constructed to best start at the higher number of poles.

An object of the invention is to provide a motor which best starts at the lower number of poles (corresponding to the higher speed) and also produces the largest torque or power at this speed, thereby rendering the motor especially applicable for centrifugal pumps and fans.

A further object of the invention is to provide a very simple stator-winding for motors of this type with a simple change-over switch for one direction of rotation as well as for both.

With the above stated and other objects in view the invention consists, essentially, in the provision of a main stator winding and an auxiliary stator winding which are both divided into two equal parts, the two parts of the main winding being connected in parallel at the lower number of poles to act as a working winding and those of the auxiliary winding being also connected in parallel and arranged magnetically in quadrature in relation to the main winding to act as a starting winding, whereas at the higher number of poles both parts of each winding are connected in series and the two complete windings thus obtained are connected in parallel and as a composite working winding connected to the line.

The invention will be hereinafter described with reference to the accompanying drawings, in which Figs. 1–4 are circuit diagrams showing each a different way of carrying the invention into effect. Fig. 1a is a winding diagram corresponding to that of Fig. 1 as changed for two poles. Fig. 2a is a winding diagram corresponding to the connections in Fig. 2 as changed similarly to Fig. 1a for four poles.

In the drawings $a$ and $b$ designate the two parts of the main winding and $c$ and $d$ are the two parts of the auxiliary winding which at the lower number of poles lies 90 electric degrees out of phase with $a$ and $b$, rendering it possible to use this winding for starting the motor.

To this end, in Fig. 1, a condenser $e$ is connected in series with the two parallel parts $c$ and $d$ of the auxiliary winding, while the two parallel parts $a$ and $b$ of the main winding can be connected to the line $h$ through the two-pole changeover switch $g$ when turned upward in the drawing.

By turning the pole changing switch $g$ downward for the higher number of poles the two parts of the main winding as well as those of the auxiliary winding are connected in series, and when the voltages induced in these two circuits are made equally large and situated in phase with each other, then the two circuits can be connected in parallel, as shown in Fig. 1, and act as a common main working winding. It is, however, necessary to take care that the ends of the auxiliary winding $c$, $d$ are so positioned on the stator periphery in relation to the ends of the main winding $a$, $b$ that the two circuits at the high-pole connection will lie in phase with each other and not in opposition to each other. It is, therefore, not necessary to short-circuit the condenser $e$ at the highpole connection, still there is no objection thereto. The condenser $e$ can remain engaged at full speed, provided it is not too large, and may then produce a fairly large starting torque. When on the other hand, a very large starting torque is required, then an additional starting condenser $i$ can be connected in parallel with $e$, which shortly after starting is disconnected by means of the switch $j$.

In Fig. 1a is shown by way of example the stator winding diagram of a two-to-four pole motor corresponding to Fig. 1, when the switch $g$ is turned upwards and the lower number of two poles is thus obtained. The stator is formed with eight slots and only one complete symmetrical winding with eight coils as an ordinary motor for two double-phases, one of which comprises the coils $a$ and $b$ and the other comprises the coils $c$ and $d$. Both phases are carried out with the same winding pitch lying between T and 2T, where T is the pole pitch for the higher number of poles. Both phases are always carried out with the same number of coils and with the same number of conductors per coil.

The current flowing through the coils are in conventional manner indicated by a single minus sign (−) indicating an instantaneous current in the main winding $a$ and $b$ coming out toward the reader and two minus signs (− −) indicating an instantaneous current in the auxiliary winding $c$ and $d$ likewise coming out toward the reader. One or two plus signs (+) indicate currents in the opposite direction. In the conductors one or two arrows indicate the direction of flow of the current therein.

With the currents flowing as shown in Fig. 1a the current in the main coils $a$ and $b$ forms the two main poles N (north) and S (south), while the current in the auxiliary coils $c$ and $d$ which is 90 electric degrees ahead of the current in the main coils, forms the two auxiliary poles N$a$ and S$a$, which causes the rotor to rotate clockwise.

Figure 2:
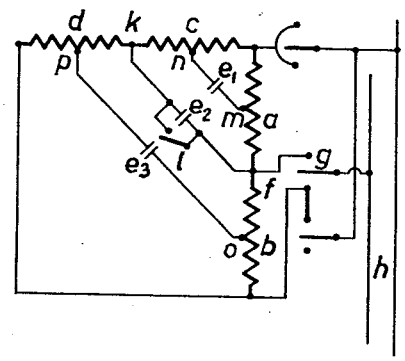

The motor shown in Fig. 1 works at the lower number of poles as a condenser-motor and at the higher number of poles as an ordinary single-phase induction-motor and has, therefore, at this number of poles a fairly small normal power. By replacing the condenser $e$ of Fig. 1 with three condensers $e_1$, $e_2$ and $e_3$, as shown in Fig. 2, this normal power can be increased. Of said three condensers $e_2$ may be short-circuited at the high pole connection through the switch 1, which to this end must be operated at the same time as the pole-changing switch $g$. The entire stator windings $a$, $b$, $c$, $d$ should be carried out as a total symmetrical winding so that the condensers $e_1$ and $e_3$ may obtain full power at the higher number of poles. Notwithstanding that the total voltages induced in the windings $a$ and $c$ or $b$ and $d$ fall entirely together, there arise still voltages between the points $m$ and $n$ as well as between $o$ and $p$ due to the generation of magnetic crossfield as synchronism, with resulting generation of electric currents through the condensers $e_1$ and $e_3$ which in their turn increase the torque and power of the motor and improve the power-factor thereof.

In Fig. 2a the winding diagram of the same stator is similar to that shown in Fig. 1a, when the switch g is turned downwards and the higher number of four poles thus obtained. With the currents flowing as shown in Fig. 2a, the main current in all coils forms the four poles N and S, which induces the same voltage according to size and phase in the coils a and b as in the coils c and d, which may thus be connected in parallel.

The cross field generated at synchronism induces voltages between m and n as well as between o and p, which produce condenser currents through $e_1$ resp. $e_3$ nearly 90 electrical degrees ahead of the main current and which superpose themselves in all coils above these latter.

Said condenser currents flowing through all coils form at synchronism four auxiliary poles Na and Sa, giving the motor a higher effect and a better power factor.

With so few slots as eight the four-pole winding is, as evident from Fig. 2a, not very well utilized. With a greater number of slots the efficiency of the four-pole winding may, of course, be considerably improved.

By inserting the condensers $e_1$ between m and n and the condenser $e_3$ between o and p, as shown in Fig. 2, the starting torque of the motor at the lower number of poles will be slightly reduced. As an alternative, as shown in Fig. 3, the condenser $e_1$ can be inserted between m and p and the condenser $e_3$ between o and n, whereby the starting torque of the motor at the lower number of poles becomes further reduced, whereas at the higher number of poles the motor can produce a still larger power effect.

The condenser $e_2$, which at the lower number of poles contributes essentially to the starting torque of the motor, can also be dispensed with when only a small starting torque is required.

Figure 4:
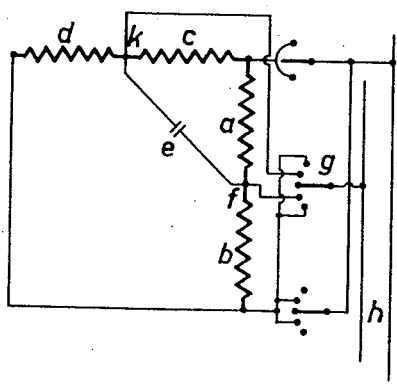

Fig. 4 shows the same arrangement as Fig. 1 as applied to a reversible motor. Here, the direction of rotation may be changed in a very simple way, viz. by having the main and auxiliary windings to change place by connecting the middle point k of the auxiliary winding c, d to the line instead of the middle point f of the main winding a, b. The two-pole pole-changing switch g is here shown as a controller for reversal as well as for pole-changing action with zero-position in the middle. By turning the controller one step to the right, the motor starts at the higher speed in one direction, and by turning the controller still one step to the right, the motor goes down to the lower speed in the same direction. Upon turning the controller to the left, the movements of the motor repeat themselves in the opposite direction.

Figure 3:
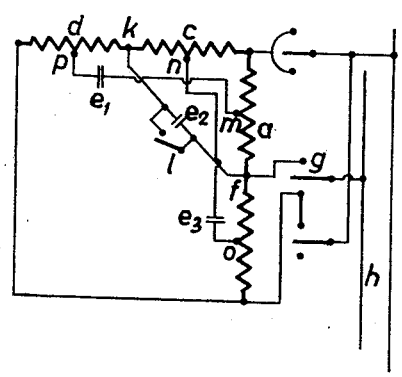

The reversible controller g shown in Fig. 4 can also be applied to the embodiments shown in Figs. 2 and 3. All the above described diagrams of connection can, as shown, be realized by means of very simple pole changeover switches, which is not possible by the use of hitherto known connection diagrams.

The above described arrangements can be applied to motors of the slipring type, of the squirrel-cage type or of repulsion type having a rotor winding connected to a communicator, short-circuited by brushes.

I claim:

1. A two-speed single-phase motor having its stator windings arranged for changing the number of poles in the relation of 1 to 2, characterized by a main-winding consisting of two equal parts and an auxiliary winding likewise consisting of two equal parts, of which at the lower number of poles the parts of the main-winding are connected in parallel to act as working windings, the parts of the auxiliary winding being also connected in parallel and arranged magnetically in quadrature to the main-winding to act as a starting winding, while at the higher number of poles the both parts of each winding are connected in series and the two complete windings thus obtained are connected in parallel and connected as a composite working winding to the line.

2. A two-speed single-phase motor as claimed in claim 1, characterized in that the both parts of the main winding are connected by means of at least one condenser to the two parts of the auxiliary winding, whereby to cause the condenser currents to give the motor at the higher number of poles an increased torque or power as well as an improved power factor.

3. A two-speed single-phase motor as claimed in claim 1, in which the main-winding is adapted to change place with the auxiliary winding, when the motor shall change its direction of rotation at the lower number of poles.

No references cited.